Oct. 19, 1965      K. E. MILLER ETAL      3,213,364
THERMOELECTRIC CONVERTER TYPE RMS METER USING FEEDBACK
REBALANCING TO MAINTAIN THE CONVERTER
AT CONSTANT TEMPERATURE
Filed Feb. 13, 1961

INVENTORS.
Kenneth E. Miller
BY Leighton C. Rama

Reynolds & Christensen

ATTORNEYS

United States Patent Office 3,213,364
Patented Oct. 19, 1965

3,213,364
THERMOELECTRIC CONVERTER TYPE R.M.S. METER USING FEEDBACK REBALANCING TO MAINTAIN THE CONVERTER AT CONSTANT TEMPERATURE
Kenneth E. Miller, Edmonds, and Leighton C. Rama, Bothell, Wash., assignors to John Fluke Manufacturing Co., Inc., Mountlake Terrace, Washington., a corporation of Washington
Filed Feb. 13, 1961, Ser. No. 89,049
11 Claims. (Cl. 324—106)

This invention relates to devices for measuring the root mean square value of electrical wave forms, and more particularly to improved precision instruments of this nature in which electrical energy to be measured is first converted into heat energy. The invention is herein illustratively described by reference to the presently preferred embodiments thereof; however, it will be recognized that certain modifications and changes therein with respect to details may be made without departing from the underlying essentials involved.

Among the various prior-art devices for root mean square measurement are diode shaping circuits. These circuits are quite limited in their frequency-response characteristic and, because of certain design approximations used, in their basic accuracy. Hall effect devices were also limited in their frequency-response characteristic, because in this instance of the magnetic circuit requirement. Diode ring modulators are limited by the weak output available, requiring complex amplifying circuits, and by inability as a practical matter to obtain matched components as necessary for attaining reasonable accuracy. Another prior-art circuit, more standard than those just mentioned, for most applications, was the heated thermocouple circuit of the type requiring a succession of manual adjustments and readings in order to compare the heating effect of the unknown signal with the heating effect from a standard voltage source. Here, accuracy was limited by the hiatus between calibration and signal readings, and it was out of the question to measure signals which changed rapidly in R.M.S. value over an appreciable range, or to make accurate measurements under rapidly changing ambient temperature conditions, due to the thermocouple calibration (i.e., nonlinearity) problem.

In general, the present invention is directed to the solution of these and similar problems encountered with previous R.M.S. metering techniques.

A specific object of the present invention is to provide an improved R.M.S. value meter capable of operation over a wide range of signal amplitudes and of signal frequencies. A related object is to provide such a device which operates as well under transient as under steady-state conditions and which is capable of yielding accurate readings not only with single-frequency signals but also with signals of mixed frequencies, such as may be represented by noise signals and the like.

Another object is to provide such a circuit in which the accuracy of the readings is independent of nonlinearities of circuit characteristics, and which does not impose the calibration problems previously encountered.

Still another object is such a device wherein the response of the meter is practically instantaneous, so that it is capable of following rapid changes in R.M.S. values being measured, despite the fact that the system relies upon the principle of converting electrical energy into heat energy. A related object is such an instrument which compensates instantly and continuously for ambient temperature changes and the like which could otherwise cause drift.

A specific object is the provision of a precision instrument of the aforementioned qualities which is also highly reliable and versatile in its application to a wide variety of measurement problems.

As herein disclosed the apparatus includes a thermoelectric generator preferably in the form of a thermocouple and associated heater energized by the electrical wave form to be measured. The thermocouple output is applied to a feedback amplifier circuit which is thereby controlled to supply variable supplemental energization to the heater, maintaining the thermocouple output substantially constant during changes of heater energization contributed by the electrical wave form. The R.M.S. value of the electrical wave form is then measured by a galvanometer or other measuring device measuring the supplemental energization current applied to the heater means.

An additional feature of the illustrative embodiment resides in providing a second heater means and associated second thermocouple both arranged in the same ambient thermal environment as the first-mentioned heater means and thermocouple, with the two thermocouples being connected together subtractively in the input of the feedback amplifier and with the second heater means energized by a reference source. Such an arrangement compensates for drift due to ambient temperature change and the like.

Still another feature resides in the preferred circuit arrangement wherein the thermocouple signal is converted into alternating current for amplification, and the amplified current is rectified for applying direct-current feedback or temperature-stabilizing bias to the first-mentioned heater.

Still another feature comprises the addition of an indicator by-pass circuit including a direct-voltage source and a circuit connection having a series resistance therein, electrically connecting this source to the side of the first heater to which the measuring device is connected, thereby to reduce the measuring device current to a predetermined initial value (preferably zero) with no electrical wave form applied.

These and other features, objects and advantages of the invention will become more fully evident from the following description thereof by reference to the accompanying drawings.

Figure 1:
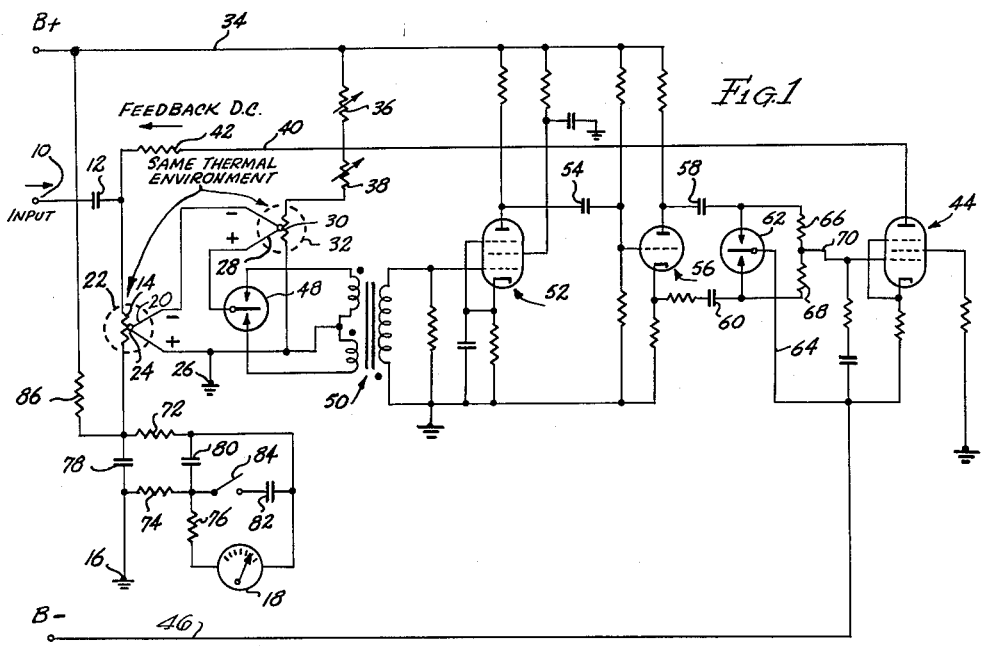
FIGURE 1 is a schematic diagram of the presently preferred form of the novel R.M.S. measuring apparatus.

Referring to FIGURE 1, the illustrated circuit apparatus has an input terminal 10 to which the electrical wave form is applied which is to be measured for its R.M.S. value. A D.-C. blocking condenser 12 is interposed serially in the input lead, which extends to one side of an electrical resistance heater element 14. This element may comprise a stretch of fine nichrome wire or the like. Its opposite side is connected to ground at point 16, or other input reference terminal. The heater element is connected serially with a direct-current galvanometer 18.

A thermocouple 20 is associated directly in heat exchange relationship with the heater 14, usually by enclosing the two within a glass tube 22 and interconnecting them at the thermocouple junction by a bead 24. In this case the positive side of the thermocouple is grounded at 26 and the negative side is connected to the negative side of a second thermocouple 28 associated with a second heater 30 in a container 32, to form a unit similar to the heater-thermocouple unit first described. The two heater-thermocouple units are physically arranged or mounted in the same thermal environment, such as within an aluminum or other conductive metal box or the like, so that ambient temperature conditions affecting one thermocouple have a like effect, as nearly as possible, on the other thermocouple.

Direct current from the B+ lead 34 is passed through the second heater 30 and two adjustable series resistances 36 and 38, respectively, the first constituting a front panel fine control adjustment and the second constituting a coarse control, mounted within the instrument shell. These resistances permit adjusting the energization of heater 30 to such a value that the output of thermocouple 28 exactly nullifies that from thermocouple 20 with no electrical wave form applied at input 10. Such an arrangement, including the two thermocouples and associated heaters, provides ambient temperature drift compensation in the instrument. For accurate compensation, it is desirable to choose heater-thermocouple units which are as nearly alike as possible in terms of ambient temperature sensitivity.

In the absence of an applied electrical wave form to be measured, thermocouple 20 is heated to a normal operating temperature by a feedback or bias current, which is preferably a direct current, although it may be an alternating current of predetermined wave form which can readily be measured in terms of R.M.S. value. This bias current flows through a feedback lead 40 including the series feedback resistance 42 therein. It is controlled in magnitude by a direct-voltage signal which is applied to the control grid of the last stage 44 of a feedback amplifier circuit. The cathode side of this stage 44 is returned to a B— terminal through lead 46, whereas the anode side thereof is returned to a point of higher potential (ground potential, at points 16 in this instance) through the lead 40, resistance 42, heater 14 and the galvanometer 18.

The signal by which amplifier 44 is controlled is derived by converting the differential output from the two thermocouples 20 and 28 into an alternating current, amplifying this alternating current and then rectifying the amplified signal. Conversion into alternating current before amplification is desirable for stability in a precision instrument due to the difficulty of amplifying direct-current signals of the small magnitude of thermocouple signals. To these ends the positive side of thermocouple 28 is connected to the input of an inverter 48 whose output terminals are connected to relatively opposite ends of the two primaries of transformer 50. The remaining ends of these primaries are grounded at 26. The secondary of this transformer is impressed across the input of an alternating current amplifier stage 52 largely of conventional design whose output is coupled through coupling condenser 54 to an additional amplifier stage 56. Push-pull or double ended connections from stage 56 are provided from the plate and cathode thereof, respectively. These extend through coupling condensers 58 and 60 to the opposing input terminals of a rectifier or demodulator device 62 having a common output terminal connected through lead 64 to the B— terminal, representing the ground side of amplifier stage 44. Series-connected resistances 66 and 68 are connected across the output terminals of rectifier 62, and the junction between these resistances is connected to the input or control grid of stage 44 through conductor 70. Thus, a direct-voltage signal is applied to stage 44 establishing the value of feedback current flowing through heater 14 in accordance with the net difference between the output signals of thermocouples 20 and 28. The polarities in the circuit are such that if the temperature of thermocouple 20 tends to depart appreciably from the normal temperature thereof, the supplemental heater energizing current delivered through feedback resistance 42 will be varied in order to oppose the change. Thus, as an electrical wave form is applied to input terminal 10 to contribute heat to the thermocouple 20, a corresponding change occurs in the direct current flowing through the heater 14 and feedback resistance 42, which is inversely related to the R.M.S. value of the applied electrical waveform. The theory of operation of the instrument is dependent on this relationship, and the electrical waveform R.M.S. value is therefore measured by the galvanometer 18 by virtue of the fact that it measures the feedback or bias current flowing through heater element 14.

Inverters 48 and 62 are preferably conventional synchronously vibrated switches commonly termed "choppers."

Since in some cases the instrument may be required for use with electrical waveforms of low frequency, a certain amount of filtering is desirable at the galvanometer 18 to prevent or minimize galvanometer needle fluctuations. This is accomplished in the illustrated case by the filter network including the series resistances 72, 74 and 76 and the shunt capacitances 78 and 80 connected together in a conventional filter circuit arrangement, with the meter connected across the series combination of resistance 76 and condenser 80. Additional filter capacitance is available from the condenser 82, through closure of switch 84.

As a further feature of the circuit, the end of heater 14 which is connected to the meter 18 is coupled through a resistance 86 to the B+ terminal in order to place the lower end of the heater resistance 14 normally at ground potential, i.e., with no electrical wave form applied. Under these conditions no current will flow through the galvanometer 18, and it will then read zero. As electrical wave form energy is applied to input terminal 10 an increasing proportion of the feedback or bias current will flow through meter 18 which represents directly the R.M.S. value of the applied wave form. This meter by-pass arrangement obviates any necessity for calibrating the meter readings with reference to an initial quiescent current flow through the meter.

Figure 2:
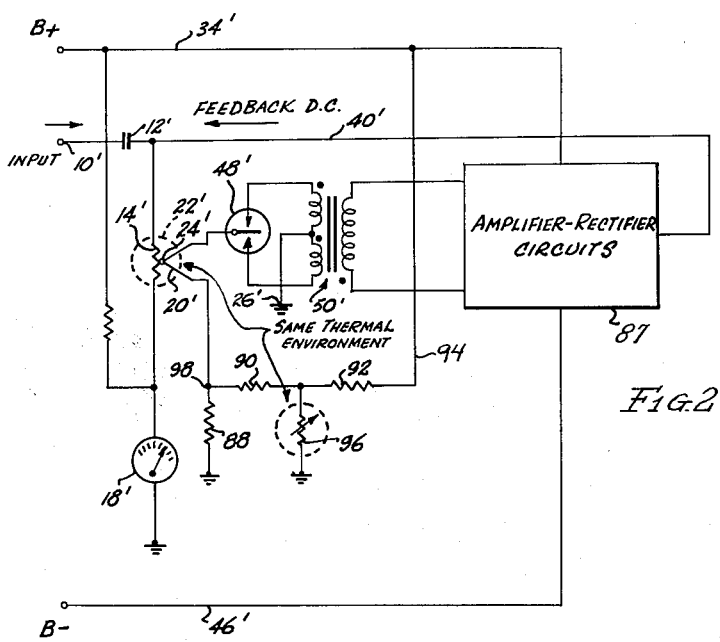
FIGURE 2 is a diagram of a modification.

In the embodiment shown in FIGURE 2 the feedback circuit stages 52, 56, 62 and 44 have been shown combined in the block labeled "amplifier-rectifier circuits" 87. Other parts of the circuit which correspond to similar parts in the preceding embodiment bear like reference numerals primed. In this embodiment drift compensation is achieved by means other than a second thermocouple and heater combination. Instead the positive side of thermocouple 20' is connected to ground through the resistance 88, which in turn is serially connected through resistors 90 and 92, and conductor 94 to the B+ supply lead 34', in a voltage divider arrangement. The junction between resistors 90 and 92 is connected to ground through a thermistor or temperature sensitive resistance element 96 having a temperature-resistance coefficient which is related to that of the thermocouple 20'. The thermistor 96 is placed in the same thermal ambient temperature environment as the thermocouple 20'. The arrangement is such that as ambient tempertaure change tends to increase or decrease the output from the thermocouple 20' an equal and opposite change is produced at the junction 98 (between thermocouple 20' and resistance 88) by the temperature-induced change in resistance of thermistor 96, thereby to compensate for and prevent drift. In other respects the circuit is generally similar to that described in the preceding embodiment except in this instance the meter 18' is connected in series with the resistance element heater 14' without benefit of special filter circuitry.

It will now be evident on the basis of the description and illustrative of representative embodiments that the objects and purposes of the invention are accomplished in a practical and effective manner, and that a desirable precision instrument capable of accurate measurement of R.M.S. values of electrical wave forms is provided which is instantaneous in its response. The quality of instantaneous response stems from the fact that despite the use of a thermoelectric generator (i.e., preferably a resistor-heated thermocouple) having inherent time lag, the feedback arrangement tends to maintain the temperature of the thermocouple essentially constant. Thus, any appreciable change in the thermocouple temperature from its normal value results in an immediate feedback signal which tends to reduce that change to zero. Consequently, since the changes of temperature of the thermocouple are limited to very small values, the time lag is correspondingly limited to very small values. The instrument is therefore a direct-reading device capable of following quite rapid changes in R.M.S. values and of doing so automatically without any necessity for interim manual adjustments or calibration settings or readings as in the past. Moreover, the frequency response characteristic is very favorable inasmuch as the pure resistance of the heater 14 enables it to convert practically all frequency components into heat, proportional to the true R.M.S. value of the applied electrical wave form, whether it be a single-frequency signal or whether it be a mixture of component frequencies.

These and other aspects of the invention will be evident to those skilled in the art from the present disclosure of the preferred embodiments.

We claim as our invention:

1. The method of measuring root mean square value of an electrical waveform with a resistance heater, comprising passing direct current through said heater while continuously applying said waveform to said heater, maintaining a thermoelectric generator in temperature exchange relationship with said heater for converting a heater temperature change caused by changing root mean square value of the applied signal into an electrical response producing an opposing compensative change of said direct current to oppose and substantially nullify said temperature change of said heater, and measuring the value of said change in direct current as a measure of signal root mean square value.

2. The method of measuring root mean square value of an electrical waveform with a resistance heater, comprising passing reference current through the heater, applying said waveform to the heater to cause the current thereof to contribute to the heat generated by said heater, maintaining a first thermoelectric converter adjacent to said heater for converting a heater temperature change caused by the root mean square value of the applied waveform into a first signal, generating a second signal proportional to changes in the thermal condition of said first convertor caused other than by changes in the current applied to said heater, subtracting said second signal from said first signal and using the resulting signal for effecting an opposing compensative change of said reference current to maintain the total current through said heater substantially constant, and measuring the change in reference current as a measure of signal root mean square value.

3. Electric circuit apparatus for measuring electrical waveform root mean square value, comprising an electrically energizable heater having an input for the continuous application of the electrical waveform thereto, a thermoelectric converter disposed in heat transfer relationship with said heater and having an electrical output which varies with heater temperature, a controlled heater reference current source connected to the heater to pass reference current through the heater and thus establish a resultant temperature therein, said controlled reference current source having an input connected to the converter output and being controllable by said converter output in such manner as to convert a heater temperature change caused by a change in said root mean square value into a compensative change in said reference current in the heater so as to maintain said resultant temperature substantially constant, and means to measure such reference current, as a measure of said root mean square value.

4. The electric circuit apparatus defined in claim 3, and compensating thermoelectric generator means disposed physically in the same thermal environment as the said heater and converter and having an output connected, in subtractive relation with the converter output, to the reference current source to offset the effect of environment temperature change on the output of the converter.

5. Electric circuit apparatus for measuring electrical waveform root mean square value, comprising an electrical resistance heater having an input for the continuous application of said waveform thereto, a thermoelectric converter disposed in heat transfer relationship with said heater and having an electrical output which varies with heater temperature, a controlled heater reference current source energizingly connected to the heater to pass direct current therethrough for establishing a resultant temperature therein, said controlled reference current source being responsively connected to the converter output and controllable by said converter output in such manner as to convert a heater temperature change caused by a change in said root mean square value into a compensative change in reference current in the heater so as to maintain said resultant temperature substantially constant, and means connected in the apparatus operable to measure such direct current as a measure of said root mean square value.

6. Apparatus for measuring root mean square value of an electrical waveform comprising a resistance heater having an input for the continuous application of said waveform to the heater, a thermoelectric converter disposed in heat transfer relationship with said heater and having an electrical output, an amplifying device having an input responsively connected to the converter output and having an amplified output circuit including a current source energizingly connected to the heater to convert changes of heater temperature, caused by changes in said value into compensative changes of current applied to the heater by said source, thereby to maintain heater temperature substantially constant, and meter means connected to the amplified output to measure energization of the heater contributed by the amplifying device.

7. The apparatus defined in claim 6, wherein the amplifying device output circuit comprises a direct-current source, a variable resistance controlled by thhe amplifying device to vary the value of such variable resistance in accordance with converter output variations, and the resistance heater is connected serially with the direct-current source and such variable resistance.

8. The apparatus defined in claim 7, and an input circuit including input conductors across which to impress the waveform, and further including said resistance heater and said meter means serially connected between said input conductors.

9. A root mean square meter comprising, in combination, reference power supply means including an intermediate potential conductor and opposing supply terminal conductors respectively positive and negative with respect to said intermediate potential conductor, a galvanometric device and a first resistance serially connected between one terminal conductor and said intermediate conductor, an electrical resistance heater and a controlled variable resistance serially connected with said first resistance between said terminal conductors to permit local heating current flow through the heater of a value controlled by said variable resistance, a thermoelectric converter disposed in heat transfer relationship with said heater to be heated thereby and having an electrical output response which varies with such heating, means to apply an electrical waveform to the resistance heater superimposed on said local current flow therein, and amplifier means having an input responsively connected to the converter output and having an output controllingly connected to the variable resistance and operable thereby to vary the resistance value of the variable resistance with variations in the output response of the converter and in a sense to compensatively increase or decrease said local heating current with corresponding decrease or increase of root mean square value of said waveform and thereby maintain the heater temperature substantially constant.

10. Electric circuit apparatus for measuring electrical waveform root means square values, comprising in combination electrically energizable heater means having input connections for the continuous application of an electrical waveform thereto, a thermoelectric generator disposed in heat transfer relationship with said heater means to be heated thereby for generating an electrical output, temperature-stabilizing feedback circuit means having an input connected to said generator and having an output connected to the heater means to supply energizing current thereto of such varying value as will maintain the temperature of said heater means substantially constant and thus maintain the generator output substantially constant accompanying variations in root mean square value of the applied electrical waveform, and a current measuring device connected serially with said heater means to measure said variable energizing current.

11. The electric circuit apparatus defined in claim 10, wherein the current measuring device is of the direct-current type and the feedback circuit means output applies direct current to the heater means and measuring device, and a by-pass circuit including a direct-voltage source and circuit means, including a series resistance, electrically connecting said source to the junction between said heater means and said measuring device, thereby to reduce the measuring device current to a predetermined initial value with no electrical waveform applied.

References Cited by the Examiner
UNITED STATES PATENTS

| | | | |
|---|---|---|---|
| 1,121,835 | 12/14 | Hiatt | 324—106 |
| 2,169,101 | 8/38 | Pierre | 324—106 X |
| 2,449,072 | 9/48 | Houghton | 324—106 |
| 2,525,901 | 10/50 | Hansen | 324—106 |
| 2,615,065 | 11/52 | Farnham | 324—106 |
| 2,805,394 | 9/57 | Hermach | 324—98 |
| 2,857,569 | 10/58 | Gilbert | 324—106 |
| 3,048,778 | 8/62 | Rumpel | 324—106 X |

FOREIGN PATENTS 763,012  12/56  Great Britain.

WALTER L. CARLSON, *Primary Examiner.*

RUDOLPH V. ROLINEC, FREDERICK M. STRADER,
*Examiners.*